United States Patent [19]
Jansen

[11] Patent Number: 4,504,935
[45] Date of Patent: Mar. 12, 1985

[54] ELECTRODYNAMIC FOCUS AND RADIAL SLIDE DRIVE FOR AN OPTICAL DISC SYSTEM

[75] Inventor: Gerardus L. M. Jansen, Eindhoven, Netherlands

[73] Assignee: U.S. Philips Corporation, New York, N.Y.

[21] Appl. No.: 483,804

[22] Filed: Apr. 11, 1983

[30] Foreign Application Priority Data

Feb. 14, 1983 [NL] Netherlands .......................... 8300540

[51] Int. Cl.³ ............................................... G11B 7/00
[52] U.S. Cl. ....................................... 369/32; 369/45; 369/220
[58] Field of Search ..................... 369/32, 44, 45, 111, 369/219, 100, 220; 350/6.3, 247; 250/201 DF

[56] References Cited

U.S. PATENT DOCUMENTS 3,969,574 7/1976 Janssen et al. ...................... 369/220

Primary Examiner—Donald McElheny, Jr.
Attorney, Agent, or Firm—Robert S. Smith

[57] ABSTRACT

An apparatus for recording and/or reading information on an optically readable rotating disc (3) comprises a slide (6) which can be driven in a radial direction in order to move an objective (1) arranged on the slide along the disc. The objective is driven directly in the radial direction by radial drive means (33) which act directly, i.e. not via the bearing means (21, 22), on the objective.

3 Claims, 3 Drawing Figures

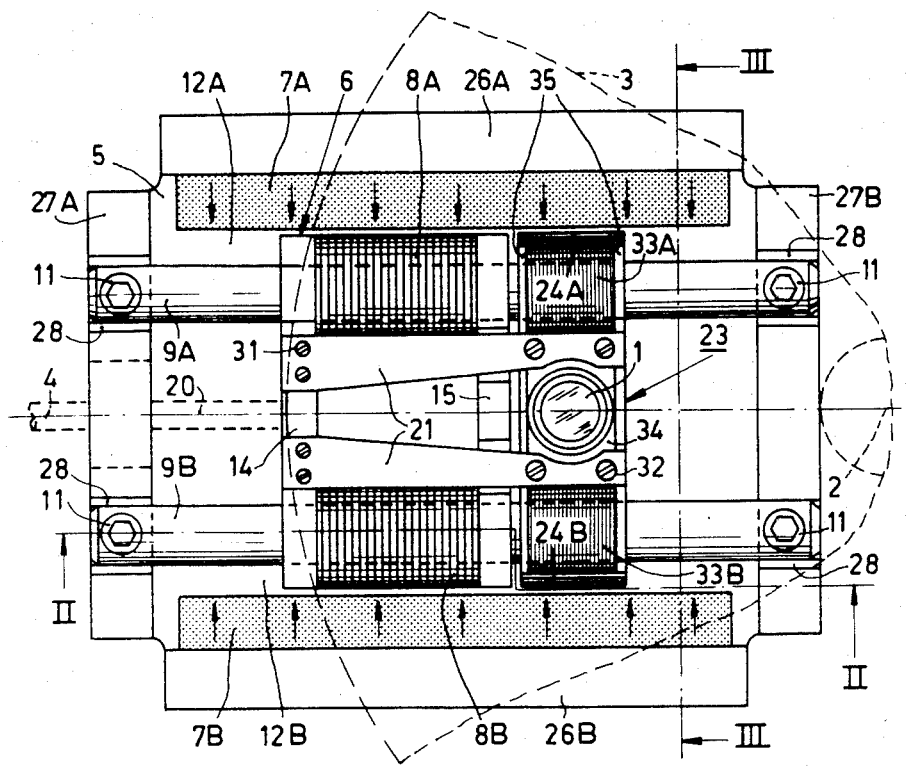
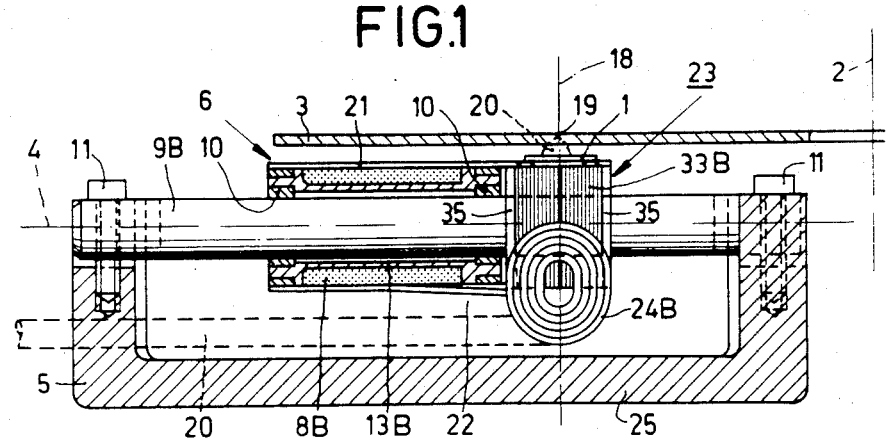

ELECTRODYNAMIC FOCUS AND RADIAL SLIDE DRIVE FOR AN OPTICAL DISC SYSTEM

BACKGROUND OF THE INVENTION

The invention relates to apparatus for recording and-/or reading information on an optically readable disc which is rotatable about an axis of rotation, which apparatus comprises: a frame; a slide which is movable over the frame along a radial path relative to the axis of rotation; electro-dynamic slide drive means for driving the slide along the radial path; an objective which is arranged on the slide and which is movable relative to the slide along a focussing axis parallel to the axis of rotation; electro-dynamic focusing drive means for driving the objective along the focusing axis; and an objective bearing arrangement comprising bearing means connected to the slide and bearing means connected to the objective.

Apparatus of the type described above is known in various versions, for example as optical video-disc players, optical audio-disc players or peripheral computer equipment for the storage and reproduction of the information on optical storage discs. In all these devices the objective is movable along the focusing axis in order to enable movements of the information surface, which inevitably occur during rotation of the disc, to be followed accurately with the laser beam which is formed to a read spot. This is necessary because the depth of focus of the objectives used is of the order of magnitude of a few microns only. Therefore, the slide must be provided with a bearing arrangement which allows the focusing movements of the objective and, depending on the construction of the apparatus, radial movements for following the track and tangential movement for correcting time errors. The objective bearing arrangement inhibits undesired movements of the objective. The radial travel of the slide on which the objective is arranged is such that the read spot can reach every track on the optically readable disc. For the rapid location of a track—and as the case may be rapidly finding a blank part of the optically readable disc in order to record information in this part—it is important that the slide can be moved rapidly along its radial path. Since the objective has a certain mass radial forces are exerted on the objective during the fast radial movements of the slide, which forces may be of such an amplitude that problems may arise when the objective is moved along the focusing axis simultaneously. Depending on the type of objective bearing arrangement used these problems may be friction problems and bandwidth problems. This will now be explained in more detail with reference to some known devices of the type mentioned in the opening paragraph.

The Applicants previous Patent Application No. 8204981, which has not been published in due time, describes a device in which the objective is arranged on the slide so as to be movable by means of a plurality of plate springs which extend in the same direction as the path of the slide. The bandwidth for the radial slide drive is limited because at high frequencies the plate springs are no longer sufficiently rigid in the radial direction. The deformation of the plate springs then gives rise to radial movements of the objective relative to the slide.

It is also known, for example from U.S. Pat. No. 4,021,101, to use a sleeve-bearing arrangement for the objective. The objective is movable in a bearing sleeve, which inevitably gives rise to some friction. In the case of slow or uniform radial movements of the slide this friction is very low because no forces act on the objective in the radial direction and, consequently, in a direction normal to the friction surfaces of the objective bearing arrangement. This is different if the slide must be moved with high accelerations and decelerations. The frictional forces then occurring depend directly on the accelerations and decelerations of the slide movement. Both the movements of the objective along the focusing axis and the movements of the slide along the radial path are controlled by electronic servocircuits. The variable friction in a focussing bearing arrangement gives rise to cross-talk between the two servo-circuits. Another problem is caused by the radial clearance between the objective and the sleeve. Tracking becomes more difficult when radial forces are exerted on the objective because then the objective does not occupy a well-defined position in the sleeve but is urged either against one wall or against the other wall, depending on the direction of movement of the slide. This may be precluded by providing a prestress in the objective bearing arrangement. However, this leads to an increase of the friction in the objective bearing arrangement, which is undesirable for several reasons, while the modulation of the frictional force as a result of the accelerations and decelerations of the slide persists.

SUMMARY OF THE INVENTION

It is an object of the invention to provide an apparatus of the type mentioned in the opening paragraph which largely mitigates the friction problems and bandwidth problems described in the foregoing. To this end the invention is characterized in that there are provided radial drive means for the objective for subjecting the objective directly, i.e. not via the bearing means, to forces acting along the radial path of the slide. By not driving the objective passively, i.e. via the bearing means, in the radial direction but by driving the objective actively with separate radial drive means it is possible to preclude that considerably forces are exerted on the bearing means during the acceleration and deceleration of the slide. Radial forces between the bearing means can be eliminated almost completely with an embodiment of the invention which is characterized in that the ratio between the radial driving forces exerted by the slide drive means and by the radial drive means respectively on the slide and on the objective including the parts connected thereto is at least substantially equal to the ratio between the masses of the slide and the objective including said parts. As a result of this the radial driving forces exerted on the objective and on the slide give rise to equal accelerations and decelerations. In principle this means that no radial forces at all have to be transmitted by the focussing bearing means.

In the apparatus in accordance with the aforementioned Patent Application No. 8204981 the slide drive means comprise stationary slide drive means on the frame and movable slide drive means on the slide. These means cooperate magnetically in an air gap which extends parallel to the radial path. In apparatus of this type an embodiment of the invention is of advantage, which is characterized in that said radial drive means comprise movable radial drive means connected to the objective, which movable radial drive means cooperate magnetically with the stationary slide drive means in said air gap. The advantages of this last-mentioned embodiment will be described in more detail for reference to the drawing.

BRIEF DESCRIPTION OF THE DRAWINGS

An embodiment of the invention will now be described in more detail, by way of example, with reference to the drawing, in which:

FIG. 1 is a schematic plan view of an apparatus in accordance with the invention, FIG. 2 is a longitudinal section taken on the lines II—II in FIG. 1.

DESCRIPTION OF THE PREFERRED EMBODIMENT

Figure 3:
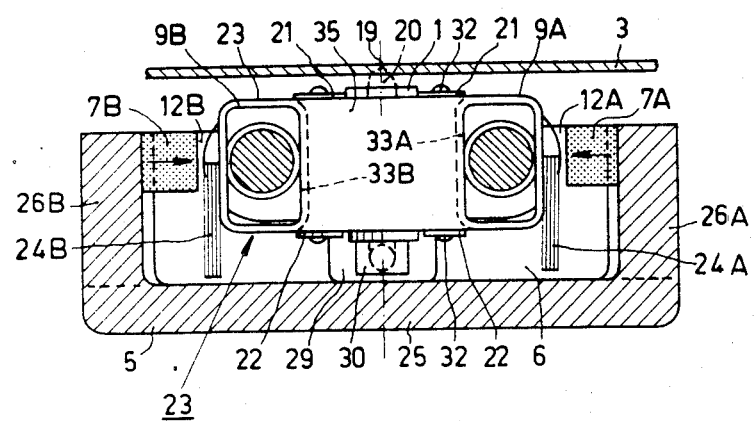
FIG. 3 is a cross-sectional view taken on the lines III—III in FIG. 1.

The apparatus shown in FIGS. 1 to 3 translates an objective 1 along a radial path 4 relative to a disc 3 which rotates about an axis of rotation 2. The apparatus comprises a frame 5 and a slide 6 which carries the objective 1 and which can be translated relative to the frame along the radial path 4. The frame carries stationary slide-drive means in the form of two permanent stator magnets 7A and 7B, which extend parallel to the path 4 and which are magnetised transversely of said path, the directions of magnetization being indicated by arrows in FIG. 1. Two translatable drive coils 8A and 8B of an electrically conductive material are movable in the magnetic field of the stator magnets.

A parallel-guide arrangement for the slide 6 comprises two guide rods 9A and 9B and four sleeve bearings 10 made of tetrafluoroethylene. The guide rods are secured to the frame 5 by means of bolts 11. They form part of a stator yoke with air gaps 12A and 12B respectively between the stator magnet 7A and the guide rod 9A and between the stator magnet 7B and the guide rod 9B, respectively. The drive coils 8A and 8B are arranged around the guide rods 9A and 9B respectively and form a structural part of the slide. In addition to the coils the slide comprises two end plates 14 and 15. These end plates serve to interconnect the two coils and are preferably made of a non-magnetisable light-weight but strong material such as a plastics or aluminium.

The objective 1 is movable along its optical axis 18 so as to enable the movements of the disc 3 to be followed by means of the read spot 19 formed by a radiation beam 20 emitted by a radiation source, not shown. The objective bearing arrangement comprises two plate springs 21 on the upper side and two plate springs 22 on the lower side. The objective is arranged on a system 23 which is bodily movable to a limited extent along the optical axis 18 and which carries movable focusing drive means in the form of two actuator coils 24A and 24B on the respective ends. The upper parts of the actuator coils are movable in the air gaps 12A and 12B respectively, between the guide rods 9A and 9B and the stator magnets 7A and 7B, so that the actuator coils cooperate with the field of the stator magnets to exert forces on the objective along its optical axis. Thus, the stator magnets are used both for driving the slide along the axis 4 and for driving the objective along the axis 18.

The frame 5 is madde of a magnetizable material, for example iron, and forms part of a stator yoke which carries the permanent magnets 7A and 7B and of which the guide rods 9A and 9B also form part, as already stated.

The frame 5 is shaped substantially as an open box having a bottom 25 and upright walls 26A, 26B and 27A, 27B. At the corners the walls are not interconnected. The complete frame is blanked from a sheet material, the walls being formed by portions which are bent over relative to the deck plate. The stator magnets 7A and 7B are secured to the inner sides of the walls 26A and 26B, for example by means of a suitable glue. The magnetic lines of force of the magnets extend from the magnets 8A and 8B through the air gaps 12A and 12B to the guide rods 9A and 9B, whose ends are placed on portions of the walls 27A and 27B. Thus they are in contact with the magnetisable frame 5 so that the magnetic circuit is closed through the frame.

In order to guarantee that the guide rods 9A and 9B extend perfectly parallel to each other and are disposed at the same level, recesses 28 with a V-shaped bottom are formed in the walls 27A and 27B. These recesses can simply be formed with the required accuracy by a machining operation. No stringent requirements are imposed on the accuracy of the other parts of the frame 5. The accuracy of the guide arrangement for the slide 6 is mainly determined by the accuracy of the shape and dimensions of the guide rods 9A and 9B and the accuracy with which they extend parallel to each other and are supported at the same level by the frame.

In the wall 27A an aperture 29 is formed which inter alia serves for the passage of the radiation beam 20. On its underside the objective 1 carries a reflecting element 30 which reflects the radiation beam through an angle of 90°. The aperture 29 may also serve for the passage of the electrical connecting wires to the coils 8A and 8B on the slide and the actuator coils 24A and 24B. Such connecting wires and other electrical connections are not shown for the sake of simplicity and are irrelevant to the present invention. The means which are generally required for detecting the position of the objective 1 in the path 4 are not shown and are also irrelevant.

For directly, i.e. not via the plate springs 21 and 22, exerting forces on the objective 1 which act along the radial path 4 there are provided radial objective-drive means in the form of two drive coils 33A and 33B. In the air gaps 12A and 12B these coils cooperate magnetically with the permanent magnetic stator which therefore not only serves driving the slide along the axis 4 and driving the objective along the axis 18, but also for exerting radial forces on the objective 1. The coils 33A and 33B are arranged around the guide rods 9A and 9B and have a rectangular shape so that they do not impede movements of the objective along the focussing axis. The objective 1 is arranged in a mount 34. This mount together with two aluminium plates 35 glued to each side of said mount, the coils 33A and 33B glued between said plates and the coils 24A and 24B glued to the plates 35 constitute the system 23.

The drive coils 8A and 8B for the slide and the drive coils 33A and 33B for the objective are dimensioned so that the radial driving forces exerted on the slide 6 and on the objective 1 respectively have the same ratio as the respective masses of the slide and of the system 23. As a result of this, substantially no radial forces have to be transmitted via the springs 21 and 22 and bolts 31 and 32.

Several embodiments of the invention are possible within the scope of the invention as defined by the Claims. For example, it is not necessary to drive the objective in the radial direction by means of coils which cooperate with the permanent magnetic stator of the slide drive. Radial drive means may be employed which are completely independent of the slide means and which comprise a separate stator. The presence of plate springs for the objective bearing arrangement in the present invention is of advantage because relative movements in the radial direction between the slide and the objective are precluded, even if the ratio between the respective driving forces is not entirely correct.

What is claimed is:

1. An apparatus for recording and/or reading information on an optically readable disc (3) which is rotatable about an axis of rotation (2), which apparatus comprises:

frame (5),
   a slide (6) which is movable over the frame along a radial path (4) relative to the axis of rotation (2),
   electrodynamic slide drive means (5, 7, 8, 9) for driving the slide along the radial path,
   an objective (1) which is arranged on the slide and which is movable relative to the slide along a focusing axis (18) parallel to the axis of rotation (2),
   electrodynamic focusing drive means (5, 7, 9, 24) for driving the objective along the focusing axis, and
   an objective bearing arrangement comprising bearing means (21, 22, 31) connected to the slide (6) and bearing means connected to the objective, characterized in that there are provided radial-drive means (33) for the objective (1) for subjecting the objective (1) to directly, i.e. not via the bearing means (21, 22, 31, 32) to forces acting along the radial path (4) of the slide (6).

2. An apparatus as claimed in claim 1, characterized in that the ratio between the radial driving forces exerted by the slide drive means and by the radial drive means respectively on the slide and on the objective including the parts connected thereto is at least substantially equal to the ratio between the masses of the slide and the objective including said parts.

3. An apparatus as claimed in claim 1, the slide drive means comprising stationary slide drive means on the frame and movable slide drive means on the slide, which means cooperate magnetically with each other in an air gap which extends parallel to radial path, characterized in that said radial drive means (33) comprise movable radial drive means connected to the objective (1), which movable radial drive means cooperate magnetically with the stationary slide drive means in said air gap (12).

* * * * *